Dec. 4, 1951    G. CONNORS    2,577,071
AUTOMATIC BRAKE APPLYING MECHANISM
Filed Jan. 24, 1945    3 Sheets-Sheet 1

INVENTOR.
George Connors
BY
Robert Robb
Attorneys

Dec. 4, 1951
G. CONNORS
2,577,071
AUTOMATIC BRAKE APPLYING MECHANISM
Filed Jan. 24, 1945
3 Sheets-Sheet 2
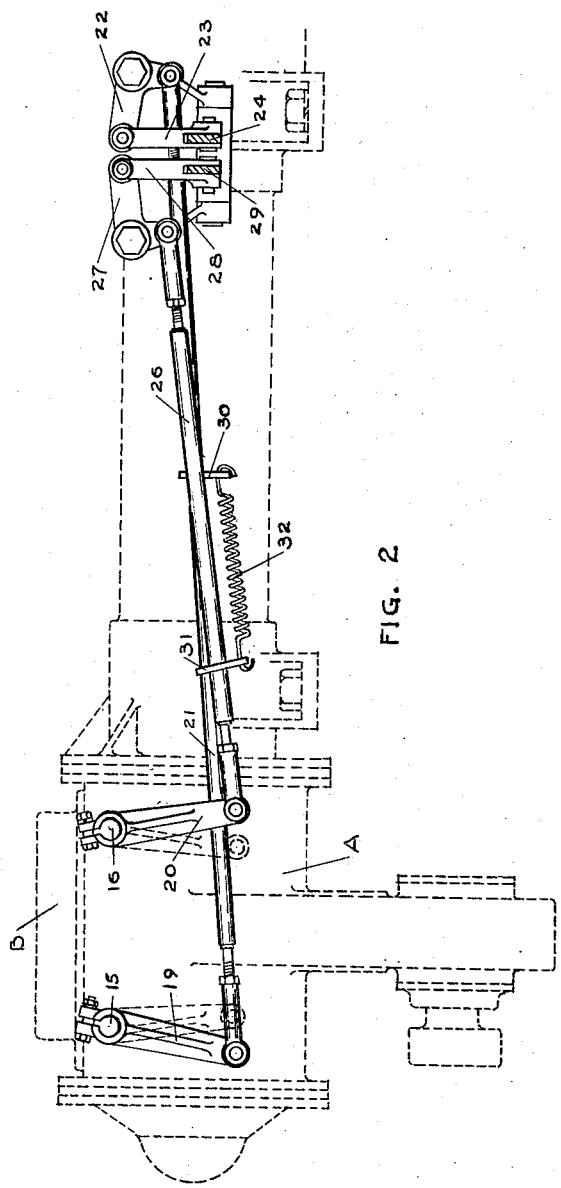
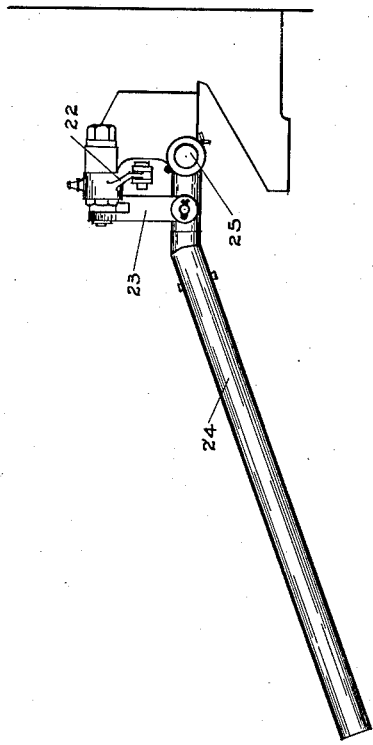
INVENTOR.
George Connors
BY
Robert Cobb
Attorneys.

Patented Dec. 4, 1951

2,577,071

UNITED STATES PATENT OFFICE 2,577,071

AUTOMATIC BRAKE APPLYING MECHANISM

George Connors, Edgerton, Wis., assignor to Highway Trailer Company, Edgerton, Wis., a corporation Application January 24, 1945, Serial No. 574,300

5 Claims. (Cl. 192—12)

This invention comprises certain novel automatic brake applying mechanism designed particularly for use in connection with earth boring machines, but susceptible of use in reference to other types of machines where similar conditions might be incurred.

Earth boring machines of the type with which my invention is used customarily employ a steel bar of slightly oblong cross section and of any predetermined length, which bar is equipped at its lower end with an auger for boring holes into the ground. The bar, with the auger attached, is moved up or down and rotated by power furnished from a suitable prime mover, generally the motor of a truck or tractor, the power delivered by any suitable power take off unit.

The digging or auger bar is raised and lowered by being driven through a train of gears known as the feed gears, while the rotation of the auger and said bar is effected by a train of gears known as drive gears. The mechanism in connection with which my invention is employed comprises a clutch and brake provided for each of the above mentioned trains of gears and customarily known as the feed clutch and brake, and the drive clutch and brake, respectively.

The brake applying means of my invention are adapted to cooperate with the said feed clutch and brake and the drive clutch and brake operating devices for automatically effecting an application of the brakes of said devices. Prior to the employment of my invention, it has been necessary for the truck operator, or person handling the operation of the hole digger auger, to place the power take off in neutral to prevent rotation of the auger because the weight of the control levers and associated parts would otherwise engage the clutches sufficiently to impart to the auger rotation when the auger is required to be idle. Also, heretofore and previous to the employment of my invention it has been necessary for the said operator to engage with the rack of the digging bar certain lock means provided heretofore in this type of boring machines, whereby to prevent the auger from coasting to the ground by its own weight when out of working operation. The instrumentalities last referred to are dispensed with in the practice of my invention by reason of the automatic brake applying provisions thereof, as will be more fully pointed out in the following description and in connection with the accompanying drawings, in which:

Figure 2 is a view in elevation showing primarily the feed clutch and brake, and the drive clutch and brake operating devices, dotted lines illustrating the housing for the clutch and brake units and associated parts, and the casing means enclosing the feed and drive shafts so far as such means is necessary to be illustrated.

Figure 4 is a side view of the control lever arrangement for the clutch and brake units, the supporting means being illustrated somewhat diagrammatically.

In a general way, the clutch and brake units and associated parts as shown in my drawings are disclosed in the patent of Menhall, 1,865,129, issued June 28, 1932, to which reference is made.

Figure 1:
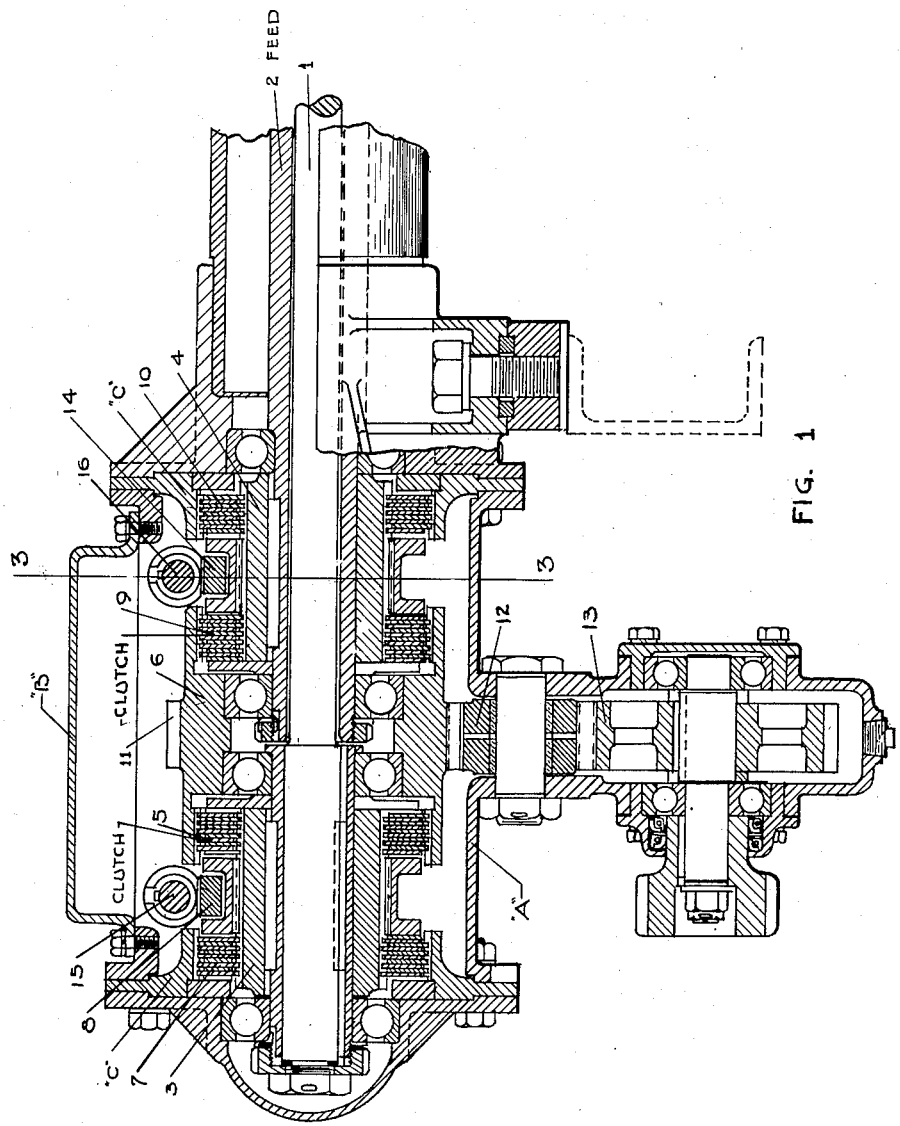
Figure 1 is a vertical sectional view of the brake and clutch control mechanism of a boring machine with which my improvements are utilized.
Figure 3:
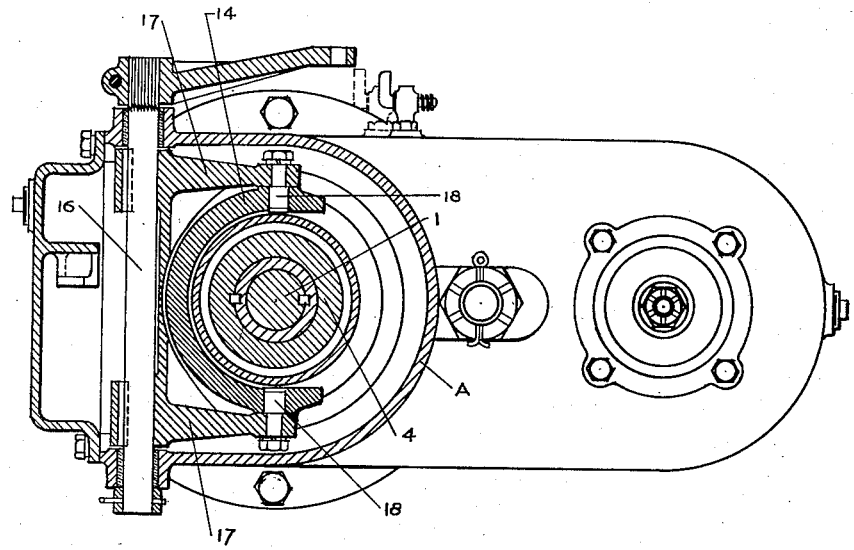
Figure 3 is a sectional view taken on the line 3—3 of Figure 1, bringing out more clearly the arrangement of the throw collars cooperating with the feed clutch and brake and the drive clutch and brake units, the construction being the same in both cases.
Figure 5:
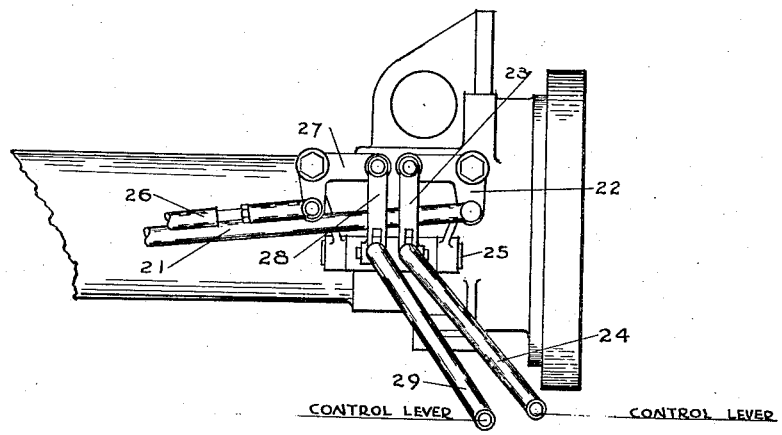
Figure 5 is a view of the features shown in Figure 4, looking toward the construction illustrated in Figure 4 from the left.

Describing my invention specifically, and referring particularly to Figures 1 and 3, there is illustrated a housing A which encloses the feed and drive clutch and brake units, the said housing having a removable cap plate B by which access may be had to the interior thereof and parts enclosed thereby. Within the housing A near the ends thereof are stationary circular flanges C suitably rigidly positioned on the housing A for a purpose hereafter to be mentioned. Also mounted in the housing A is a shaft 1, hereafter termed the drive shaft, for rotation of the digging bar of a boring machine, said shaft 1 being enclosed in the tubular shaft 2, hereafter termed the feed shaft because it drives certain transmission gearing for effecting the feed movement of the digging bar. The drive shaft 1 likewise is connected by transmission gearing, not shown, for causing the rotative movement of the digging or auger bar. On the shaft 1, in the left portion of the housing A, is keyed a clutch and brake hub 3. On the hollow shaft 2 is likewise keyed the clutch and brake hub 4.

The shafts 1 and 2 will of course be mounted in suitable bearings according to known practice, and not specifically described because not a part of the present invention per se. Around the hub 3 are clutch discs 5 which are interlocked to the hub 3 at inner portions thereof, and interlocked at outer portions to the drive and clutch shell 6. Also the hub 3 has interlocked therewith at the inner open portions thereof a series of brake discs 7, and cooperating brake discs 7 are interlocked at their outer peripheries to the adjacent left hand flange member C. Between the two series of discs 5 and 7 operates the throw collar 8 for the drive clutch and brake unit which is disposed as seen in Figure 1 at the left of the drive and clutch shell 6. At the right end of the shell 6 and associated with the feed shaft hub 4 is a similar arrangement of clutch and brake discs to that just described, clutch discs 9 directly cooperative between the hub 4 and shell 6 and brake discs 10 directly cooperative between the hub 4 and the right hand brake flange member C. The members 9 and 10 provide a clutch and brake unit similar to the one provided by the parts 5 and 7 respectively. The clutch and brake shell 6 is provided with an external surrounding gear 11 driven from a suitable pinion 12 and driving gear 13, the latter being directly operated from a power take off connected with the motor of the truck upon which the mechanism of my invention is mounted.

For the feed clutch and brake unit, including the parts 9 and 10, I also provide the clutch throw collar 14 similar to the collar 8 and the collar 8 is rockable about the rocker shaft 15, while the collar 14 is rockable about the rocker shaft 16.

In the case of both the feed clutch and brake, and the driving clutch and brake, the shafts 15 and 16 carry spaced arms 17 keyed thereto, and these arms have throw pins 18 that shift the collars 8 and 14 after known practice, these features being shown clearly in Figure 3 of the drawings.

At one outer end of the shaft 15 is an operating arm 19 fixed thereto, and at one outer end of the shaft 16 is a similar operating arm 20. The arm 19 is connected by an actuating rod 21 to a bell crank lever 22, see Figure 2, which bell crank lever is connected by a link 23 to a main hand lever 24 pivoted at 25 to a side of the housing for the shafts 1 and 2. In a similar manner the arm 20 is connected by an actuating rod 26 to a bell crank lever 27, and the latter is attached by a link 28 to a second hand lever 29 pivoted on the same axis 25 as is the lever 24. The lever 24 is adapted to operate the parts last mentioned as connected with it in order to rock the arm 19 and operate the drive clutch and brake unit controlled by the throw collar 8, whilst the lever 29 is connected by the parts mentioned to the arm 20 for operating the feed clutch and brake unit. The feed clutch and brake unit of course cooperates with the feed shaft 2, and the drive clutch and brake unit cooperates with the drive shaft 1.

Attached to the rod 21 is a connector plate 30, and a similar connector plate 31 is attached to the rod 26. Each of the rods is adjustable as to length, as shown. Connecting the two connector plates 30 and 31 is the automatic operating spring 32, the action of which is to cause automatic relative movement of the members 21 and 26 so as to effect operation of the arms 19 and 20 for application of the brake parts of the drive clutch and brake unit, and the feed clutch and brake unit.

The operation of my invention may be generally set forth as follows:

The control levers 24 and 29 are located near the end of the truck body for what is known as ground control, or where the operator stands on the ground. Pressure downward on the control levers 29 and 24 will engage the clutches, while pressure upward on the levers will apply the brakes. Downward pressure on the feed or left hand lever 29 while upward pressure is applied to the drive or right hand lever 24 will engage the feed clutch and apply the drive brake and cause the auger and digger bar to rise. Upward pressure on the feed or left hand lever while downward pressure is applied to the drive or right hand lever will cause the auger to descend rapidly to the ground preparatory to digging. Downward pressure on both levers will engage both clutches and cause the auger to rotate and feed into the ground.

When the hole being bored by the auger is completed, the auger is raised to its extreme upward position and the operator then completely releases his hold on the control levers 29 and 24. This brings into action the automatic spring 32, which pulling through the connector plates 30 and 31 acting on the rods 21 and 26 applies both the feed and drive brakes at the same time, immediately the manual control of the two control levers 29 and 24 is released. With the feed and drive brakes applied, the machine carrying my mechanism above described may be moved to the location of the next hole without danger of the auger rotating or coasting toward the ground.

It is unnecessary, in the use of my automatic functioning spring 32 control, to engage any rack lock with the rack of the digging bar, so such rack lock can be dispensed with. Nor is it necessary for the operator of the truck to throw the power take off driving transmission gearing into neutral for preventing rotation of the auger. Having in mind that as many as a hundred hole boring operations a day may be effected in the use of my boring machine mechanism, it will be apparent that the employment of my automatic brake applying device affords advantageous operation, and, furthermore, eliminates the need for the special lock devices cooperating with the digging bar.

The human equation requirement in reference to the proper operation of the hand levers 24 and 29 to ensure locking of the digging bar or neutralizing of the power take off drive means at proper times is eliminated in the practice of my invention.

Having thus described my invention, what I claim as new and desire to secure by Letters Patent of the United States is:

1. In mechanism of the class described in combination, a drive shaft, a feed shaft, a clutch and brake unit for each of said shafts, driving means for said shafts, connections between said shafts and driving means including movable clutch elements, a fixed and movable brake element for each brake and clutch unit, a separate manual device for each clutch and brake unit for controlling the operation thereof, and means common to the manual devices of both units for simultaneously throwing the manual devices into positions causing engagement of the fixed and movable brake elements of both units and disengagement of the movable clutch elements, immediately upon release of manual pressure on the common means.

2. In mechanism of the class described, in combination, a drive shaft, a feed shaft, a clutch and brake unit for each of said shafts, driving means for said shafts, connections between said shafts and driving means including movable clutch elements, a fixed and movable brake element for each brake and clutch unit, a separate manual device for each clutch and brake unit for controlling the operation thereof, and automatic means common to the manual devices of both units for simultaneously throwing the said manual devices into position causing engagement of the fixed and movable brake elements of both units and disengagement of the movable clutch elements, immediately upon release of manual pressure on the common means.

3. In mechanism of the class described, in combination, a drive shaft, a feed shaft, a clutch and brake unit for each of said shafts, driving means for said shafts, connections between said shafts and driving means including movable clutch elements, a fixed and movable brake element for each brake and clutch unit, a separate manual device for operating each clutch and brake unit to engage the fixed and movable brake elements and disengage the movable clutch elements and vice versa, and automatic means for simultaneously throwing both of the said manual devices into brake applying positions upon release of manual pressure thereon, said last means including an actuating bar between each manual operating device and each of the feed and drive clutch and brake units, and a spring operatively connected with both of said actuating bars for effecting brake applying and clutch disengaging conditioning of both of said units on release of manual pressure on the manual operating devices.

4. In mechanism of the class described, in combination, a drive shaft, a feed shaft, a clutch and brake unit for each of said shafts, driving means for said shafts, connections between said shafts and driving means including movable clutch elements, a fixed and movable brake element for each brake and clutch unit, a separate manual device for operating each clutch and brake unit to engage the fixed and movable brake elements and disengage the movable clutch elements and vice versa, and automatic means for simultaneously throwing both of the said manual devices into brake applying positions upon release of manual pressure thereon, said last means including an actuating bar between each manual operating device and each of the feed and drive clutch and brake units, and a spring operatively connected with both of said actuating bars for effecting brake applying and clutch disengaging conditioning of both of said units on release of manual pressure on the manual operating devices, said actuating bars being disposed side by side and each equipped with a connector plate arranged so that the two connector plates are spaced from each other, and the spring is attached at opposite ends to the connector plates and contractible for effecting relative longitudinal movement of the actuating bars for effecting brake applying action of the fixed and movable brake elements, on release of actuating pressure upon the said manual devices.

5. In mechanism of the class described, in combination, a drive shaft, a feed shaft, a clutch and brake unit for each of said shafts, connections between said shafts and driving means including movable clutch elements, a fixed and movable brake element for each brake and clutch unit, a separate manual device for operating each clutch and brake unit for alternately driving or braking its respective shaft, respectively, and automatic means, common to said units for simultaneously throwing both of the said manual devices into brake applying positions with the fixed and movable brake elements of both units in engagement upon release of manual pressure on said manual devices, said last means including an actuating bar between each manual operating device and each of the feed and drive clutch and brake units, said actuating bars being arranged side by side for portions of their length and a spring connecting the two operating bars together and automatically effecting the said automatic applying action of the brake members of both clutch and brake units incident to the release of the manual pressure previously referred to.

GEORGE CONNORS.

REFERENCES CITED

The following references are of record in the file of this patent:

UNITED STATES PATENTS

| Number | Name | Date |
|---|---|---|
| 423,431 | Kisinger | Mar. 18, 1890 |
| 967,331 | Covell | Aug. 16, 1910 |
| 1,461,800 | Lewis | July 17, 1923 |
| 1,865,129 | Menhall | June 28, 1932 |
| 1,912,645 | Le Tourneau | June 6, 1933 |
| 2,286,547 | Hutchins | June 16, 1942 |
| 2,366,433 | Bridwell et al. | Jan. 2, 1945 |